UNITED STATES PATENT OFFICE.

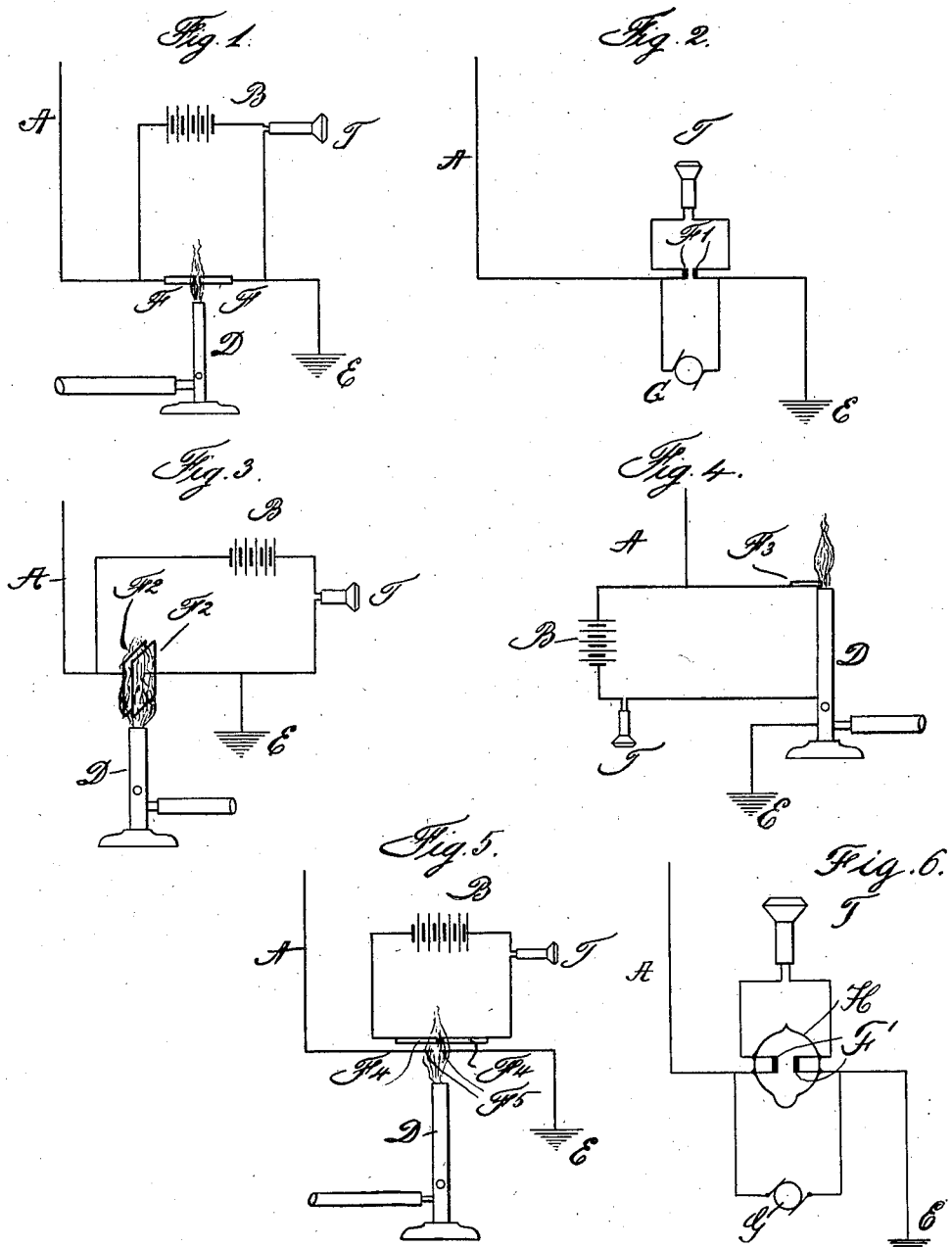

LEE DE FOREST, OF NEW YORK, N. Y., ASSIGNOR, BY MESNE ASSIGNMENTS, TO DE FOREST RADIO TELEPHONE CO., A CORPORATION OF NEW YORK.

OSCILLATION-RESPONSIVE DEVICE.

979,275.   Specification of Letters Patent.   Patented Dec. 20, 1910.

Application filed February 2, 1905. Serial No. 243,913.

*To all whom it may concern:*

Be it known that I, LEE DE FOREST, a citizen of the United States of America, and a resident of the borough of Manhattan, city, county, and State of New York, have invented certain new and useful Improvements in Oscillation-Responsive Devices, the principles of which are disclosed in the following specification and accompanying drawings, which explain the form of the invention which I now consider to be the best of the various forms in which the principles of the invention may be embodied.

My invention relates to an improvement in the sensitive member used in systems of wireless telegraphy to detect the electrical waves or oscillations and comprises the novel features hereinafter shown and described and particularly pointed out in the claims.

In the accompanying drawings I have shown, and in the description thereof will point out, certain forms of construction which may be employed in carrying out my invention and in connection therewith I will point out the principle of my invention.

Although by no means all the known or possible embodiments of my invention are herein illustrated or described, sufficient are given to make clear the principle of my invention.

Figures 1 to 6 inclusive each represents a receiving set for a wireless telegraph system, each having a sensitive member differing in appearance but all embodying the principle of my invention.

I have discovered that if two bodies adapted for use as electrodes or conductive members, be electrically separated partially or wholly, after the manner common in analogous devices, the separation between them may be neutralized sufficiently to enable them to act as a detector of electrical oscillations, if the intervening or surrounding gaseous medium be put into a condition of molecular activity, such for instance as would be caused by heating it in any manner, as by radiation, conduction, or by the combustion of gases in the space which surrounds the poles. Such condition or molecular activity causes what would otherwise be a non-sensitive device to become sensitive to the reception of electrical influences. I am thus enabled to employ as such sensitive member, devices which would otherwise be of no value, or to make those devices now used more sensitive to the electrical waves. This principle is embodied in the apparatus illustrated in the various figures shown.

In each of these figures, A represents the antenna or receiving conductor, or wave intercepting means; E, the earth connection; F, $F^1$, $F^2$, $F^3$, $F^4$, and $F^5$, the electrodes used in their various forms; B the local battery; and T, the receiving or indicating instrument, which is herein shown as a telephone receiver, the same being shown only as typical of any form of indicating apparatus capable of being employed for such purposes.

In Fig. 1 the two electrodes F, F, are slightly separated and are within the flame of an ordinary Bunsen burner D. Under these conditions the electrodes may be adjusted so that there is normally no indication of a passing current given by the receiving instrument, such as the telephone T. The electrical separation of the electrodes is however insufficient to prevent electrical oscillations from jumping the gap. The influence of these oscillations upon the heated gas seems to break down or lower the insulating quality of the gap, so that, while the influence of the oscillations lasts, the current of the local circuit may pass between the electrodes, thus affecting the indicating instrument therein to produce a signal. This may be due to ionization of the gases surrounding the electrodes which greatly increases their conductivity, said ionization being more or less accomplished or greatly facilitated by their previous heating which has already put them into a condition of intense molecular activity.

In Fig. 2 the electrodes $F^1$, $F^1$, are of sufficiently great resistance to be heated by a current from a dynamo G, and by their radiation heat the gas between them. This gas may be air or the electrodes may be inclosed and surrounded by any suitable gas as shown, for example, in Fig. 6 in which said electrodes are inclosed in the receptacle H. The heating of the gas may also be by radiation from the electrodes $F^1$, $F^1$.

In Fig. 3, the electrodes assume the form of two parallel plates $F^2$, $F^2$, which are heated by a Bunsen burner. Although I have shown a Bunsen burner for this purpose, this particular heating device is not essential, as any means of heating may be employed.

In Fig. 4 the burner itself is made one of the electrodes, the other of which is shown at F³.

In Fig. 5 the local circuit is provided with electrodes F⁴, F⁴, and the oscillation-receiving circuit with separate electrodes F⁵, F⁵, both being heated by the flame of the Bunsen burner. The effect in this case is the same as before stated, that is the passage of the oscillations enables the current of the local circuit to jump the gap between the electrodes F⁴, F⁴ and thus to operate the receiving instrument. The oscillations apparently ionize the gas and thus temporarily reduce its insulating power or in other words increase its conductivity and enable the current of the local circuit to overcome the resistance between its poles. The action described may be effected by controlling the composition of the gases between and surrounding the electrodes or poles of the sensitive member. As an instance of this the addition of sodium or salts of the halogen class in the flame increases the ionization and conductivity of the gases and increases the sensitiveness of the device. Such control of the gases I consider to be within the scope of my invention.

While I have shown and described various means for securing this result I am aware that not all the possible means have been mentioned. Sufficient have however been described to indicate of what my invention consists. Any means for producing a heated gas with properly dissociated and conducting ions may be used.

I claim:

1. In a wireless telegraph system, the combination with separated electrodes connected to a wave intercepting means and to a local circuit, said electrodes being separated by a dielectric; of means coöperating with the received electrical oscillations for causing abnormal molecular activity in the intervening dielectric.

2. In a wireless telegraph system, the combination with separated electrodes connected to wave intercepting means and to a local circuit, said electrodes being separated by a dielectric; of means other than the received electrical oscillations, for heating the intervening dielectric.

3. In a wireless telegraph system, the combination with separated electrodes connected to a wave intercepting means and to a local circuit, said electrodes being separated by a dielectric; of a flame in the intervening dielectric.

4. In a wireless telegraph system, the combination with separated electrodes connected to a wave intercepting means and to a local circuit, said electrodes being separated by a dielectric; of means other than the received electric oscillations for changing the insulating quality of the intervening dielectric for the current of the local circuit.

5. In a wireless telegraph system, the combination with separated electrodes connected to a wave intercepting means and to a local circuit, said electrodes being separated by a dielectric; of means other than the received electrical oscillations, for changing the conductivity for the current of the local circuit, of the intervening dielectric.

6. In a wireless telegraph system, the combination with separated electrodes connected to a wave intercepting means and to a local circuit, said electrodes being separated by a dielectric; of a flame in the intervening dielectric, and a substance in the flame for increasing the conductivity of the gases.

7. In a wireless telegraph system, the combination with separated electrodes connected to a wave intercepting means and to a local circuit, said electrodes being separated by a dielectric; of means other than the received electrical oscillations, for maintaining a heated gas in the dielectric.

8. A sensitive detector for electrical oscillations, which comprises two electrodes and means for maintaining a heated gas therebetween.

9. A sensitive detector for electrical oscillations, which comprises two electrodes separated by a flame.

10. The combination with a detector of electrical oscillations, having separated electrodes, of means for maintaining between said electrodes, media in abnormal molecular activity.

11. The combination with a detector of electrical oscillations, having separated electrodes, of means for heating the intervening medium, and a substance in such heated medium which increases the conductivity thereof.

12. In a system of wireless or space telegraphy, the combination with intercepting means at a receiving station for intercepting electric waves transmitted through space from a transmitting station, of a detector in coöperative relationship with said wave intercepting means, for detecting the feeble oscillations caused by the intercepted waves to traverse said wave intercepter; a local circuit in coöperative relationship with said detector; an indicating device and a source of electromotive force coöperatively associated with said local circuit; said detector comprising two electrodes separated by an intervening di-electric, whereby both the received oscillations traversing said wave intercepting means and said local source of electromotive force, are normally inoperative with respect to said detector and indicating device; and means for establishing a heated gas in the space of separation between the electrodes of said detector, to permit the received oscillations to traverse such space and to thereby cause the local circuit of the local source of electromotive force to operate said indicating device when oscillations are caused in the wave intercepting means by transmitted waves.

13. In a system of wireless or space telegraphy, the combination with intercepting means at a receiving station for intercepting electric waves transmitted through space from a transmitting station, of a detector in coöperative relationship with said wave intercepting means, for detecting the feeble oscillations caused by the intercepted waves to traverse said wave intercepter; a local circuit in coöperative relationship with said detector, an indicating device and a source of electromotive force coöperatively associated with said local circuit; said detector comprising two electrodes separated by an intervening dielectric, whereby both the received oscillations traversing said wave intercepting means and said local source of electromotive force, are normally inoperative with respect to said detector and indicating device; a gas burner, and means for conveying a supply of gas thereto, said burner being arranged so that its flame will intervene in the space of separation between the electrodes of said detector, to permit the received oscillations to traverse such space and to thereby cause the local circuit of the local source of electromotive force to operate said indicating device when oscillations are caused in the wave intercepting means by transmitted waves.

14. In a system of wireless or space telegraphy, the combination with intercepting means at a receiving station for intercepting electric waves transmitted through space from a transmitting station, of a detector in coöperative relationship with said wave intercepting means, for detecting the feeble oscillations caused by the intercepted waves to traverse said wave detector; a local circuit in coöperative relationship with said detector; an indicating device and a source of electromotive force coöperatively associated with said local circuit; said detector comprising two electrodes separated by an intervening dielectric, whereby both the received oscillations traversing said wave intercepting means and said local source of electromotive force, are normally inoperative with respect to said detector and indicating device; a burner, and means for conveying a supply of combustible matter thereto, said burner being arranged so that its flame will intervene in the space of separation between the electrodes of said detector, to permit the received oscillations to traverse such space and to thereby cause the local circuit of the local source of electromotive force to operate said indicating device when oscillations are caused in the wave intercepting means by transmitted waves.

15. In a system of wireless or space telegraphy, the combination with intercepting means at a receiving station for intercepting electric waves transmitted through space from a transmitting station, of a detector in coöperative relationship with said wave intercepting means, for detecting the feeble oscillations caused by the intercepted waves to traverse said wave intercepter; a local circuit in coöperative relationship with said detector; an indicating device and a source of electromotive force coöperatively associated with said local circuit; said detector comprising two electrodes separated by an intervening dielectric, whereby both the received oscillations traversing said wave intercepting means and said local source of electromotive force, are normally inoperative with respect to said detector and indicating device; and means for establishing a heated gas in the space of separation between the electrodes of said detector, to permit the received oscillations to traverse such space and to thereby cause the local circuit of the local source of electromotive force to operate said indicating device when oscillations are caused in the wave intercepting means by transmitted waves; and a substance in said space of separation, which coöperates with the heated gas to increase the conductivity thereof.

16. In a system of wireless or space telegraphy, the combination at a receiving station with a detector of feeble oscillations caused by transmitted electromagnetic waves; of a circuit for said detector, which includes a source of electromotive force and an indicating device; said detector comprising two electrodes separated by an intervening dielectric, whereby both the received oscillations and source of electromotive force are normally inoperative with respect to said detector and indicating device; and means for establishing a heated gas in the space of separation between the electrodes of the detector, to permit the received oscillations to traverse said space and to thereby cause the circuit of the source of electromotive force to operate said indicating device when oscillations are received.

17. The combination with a detector of electrical oscillations of space telegraphy, said detector having electrodes separated by a dielectric, of means for heating the intervening dielectric, and a substance in said intervening dielectric which coöperates with said heating means to increase the conductivity of said dielectric.

18. An oscillation responsive device comprising a gaseous medium, means for increasing the electrical conductivity of said gaseous medium, means for impressing electrical oscillations upon said medium, and means operatively connected therewith and responsive to alterations in the conductivity thereof.

19. An oscillation responsive device comprising a gas, means for putting said gas in a condition of molecular activity, means for impressing electrical oscillations upon said gas and means operatively connected therewith and responsive to alterations in the conductivity thereof.

20. An oscillation responsive device comprising a gaseous medium and means for heating said medium.

21. An oscillation responsive device comprising a gaseous medium and means for putting said medium in a condition of molecular activity.

22. An oscillation responsive device comprising a sensitive gaseous conducting medium containing a halogen salt.

23. An oscillation responsive device comprising a sensitive gaseous conducting medium containing a halogen salt and means for heating said medium.

24. An oscillation responsive device comprising a sensitive gaseous conducting medium containing a sodium salt.

25. An oscillation responsive device comprising a sensitive gaseous conducting medium containing a sodium salt and means for heating said medium.

26. An oscillation responsive device comprising a sensitive gaseous conducting medium containing a halogen salt and means for putting said medium in a condition of molecular activity.

27. An oscillation responsive device comprising a sensitive gaseous conducting medium containing a sodium salt and means for putting said medium in a condition of molecular activity.

28. An oscillation responsive device comprising a gaseous medium and means for rendering said gaseous medium sensitive to electrical oscillations.

29. An oscillation responsive device comprising a gaseous medium and means for increasing the conductivity of the said gaseous medium to such an extent as to render the same sensitive to electrical oscillations.

30. A self-restoring, constantly-receptive oscillation responsive device comprising in its construction a sensitive conducting gaseous medium.

31. A sensitive receiving member for wireless telegraphy having two poles separated by heated gas.

32. A sensitive receiving member for wireless telegraphy having two poles and means for surrounding the same with a heated gas.

33. A sensitive receiving member for wireless telegraphy having two poles surrounded by a flame.

34. A sensitive receiving member for wireless telegraphy employing a heated gas as a part of its conductive system.

35. In a sensitive receiving member for wireless telegraphy, the combination with two separated poles, of means for producing a condition of intense molecular activity in the medium intervening between said poles.

36. The combination with a sensitive receiving member for wireless telegraphy, of two separated poles and means for surrounding said poles with a medium which is continuously in a condition of intense molecular activity.

37. The combination with a sensitive receiving member for wireless telegraphy, of means for heating the medium intervening between the poles of said sensitive member and for introducing in said medium a substance adapted to increase its conductivity.

38. A sensitive receiving member for wireless telegraphy employing a gas maintained in a condition of molecular activity as a part of its conductive system.

39. In a sensitive receiving member for wireless telegraphy, the combination with separated poles, of means maintaining a condition of molecular activity in the medium intervening between said poles.

40. A wave detector having an electro-radiant wave detecting circuit including electrodes separated by an unconfined gaseous medium.

41. A wave detector having an electro-radiant wave detecting circuit formed in part by a body of free gaseous particles.

Borough of Manhattan, city and county of New York, November 4, 1904.

LEE DE FOREST.

Witnesses:
PHILIP FARNSWORTH,
JULIET SCHWALBACH.